No. 622,880. Patented Apr. 11, 1899.
W. C. BRANDENBURG.
BICYCLE.
(Application filed July 28, 1897.)
(No Model.)

WITNESSES:
Harry S. Rohrer.
H. Lewis

INVENTOR
Wm Clinton Brandenburg.
BY
Davis & Co.
ATTORNEYS.

UNITED STATES PATENT OFFICE.

WILLIAM CLINTON BRANDENBURG, OF NEAR SYKESVILLE, MARYLAND.

BICYCLE.

SPECIFICATION forming part of Letters Patent No. 622,880, dated April 11, 1899.

Application filed July 28, 1897. Serial No. 646,271. (No model.)

*To all whom it may concern:*

Be it known that I, WILLIAM CLINTON BRANDENBURG, of near Sykesville, county of Carroll, State of Maryland, have invented a new and useful Improvement in Bicycles, of which the following is a full and clear description, reference being had to the accompanying drawings, in which—

Figure 1:
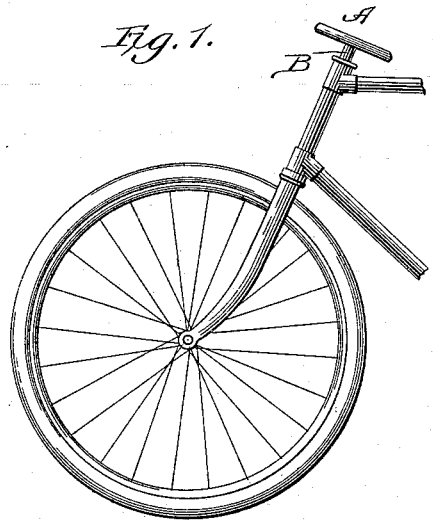
Figure 2:
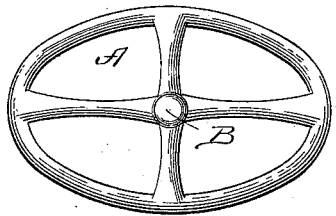
Figure 3:
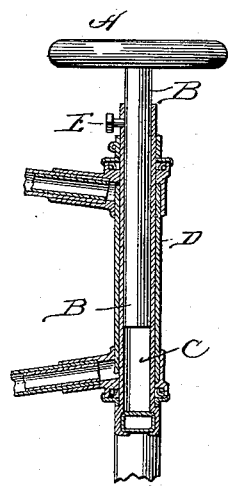

Figure 1 is a view of a bicycle provided with my improvement; Fig. 2, an enlarged view of said improvement; Fig. 3, a detail view, partly in section.

The object of my invention is to provide means for guiding the bicycle which shall embody the elements of strength, durability, and adjustability and incidentally to provide a device which may be manufactured at comparatively small cost.

As shown in the drawings, I provide instead of the handle-bar heretofore used a handwheel, as A. This wheel is made elliptical in form, and such form is a material feature of my present invention, as when racing the rider is greatly aided in the application of power by grasping the hand-wheel close to the front post. When, however, the rider is in an upright position, the hands must be placed farther apart. To obtain the first position, the rider merely turns the wheel A with its major diameter extending the length of the machine, the wheel being readily turned upon the change of position.

Secured in A and made in one piece therewith in order to give the greatest possible strength to the parts is a shaft or post B. Said post may be given any desired form in cross-section as in experience it may be found most expedient. The front fork of the machine is passed up through the frame in the old and well-known manner. (See Fig. 3.) The cylindrical tube C, which forms the upper portion of the front fork, will be formed to receive the said post B and will agree with the form of B whether the same be round or square in cross-section. Portion B of the elliptical wheel A is adapted to be entered into the hollow tube C after the same shall have been passed upward into and through the frame D, freedom of vertical movement being allowed post B in the tube. Tube C is perforated above the upper bearing-box to receive a set-screw E, the purpose of which is to securely hold post B and wheel A in any position of adjustment desired by the person using the same.

It will be readily seen that by my improved construction great strength is obtained at a point of weakness of parts heretofore developed. The parts A and B of my device being made in one piece this acknowledged weakness is entirely overcome and the confidence of the rider is at once obtained. Being simple in construction the device may be manufactured at little cost and may be attached to any bicycle with but slight change in the existing parts.

By my improvement a very serious fault heretofore experienced is overcome. It is not necessary for the rider to assume and retain the same position throughout. The extreme forward posture taken by the rider when racing may be had by placing elliptical wheel A in its lowermost position, and by simply raising said wheel the rider may assume a perfectly upright position without, as is now necessary, removing his hands from the means by which his machine is properly guided.

It is to be understood that my improved elliptically-shaped steering-wheel admits of being horizontally adjusted in the steering-head of a bicycle, so as to provide a handle-bar of different widths in its different positions of adjustment, it being understood that the rim of the wheel, as well as the connecting-spokes, are shaped to provide gripping-surfaces for the hands of the rider. For the purpose of fast riding the wheel is adjusted so that its minor axis will be in a line with the arms of the rider, thus bringing the narrower breadth of the ellipse, as well as the shorter spokes, into position for use, enabling the rider to bend forward and bring his hands close together as he grasps the steering-wheel or the spokes. For ordinary riding the wheel is adjusted so that its major axis will be in a line with the arms of the rider, thus bringing the greatest width of the ellipse and the longer spokes into position, which accordingly bring the hands of the rider farther apart and enables him to assume an upright position. It will be seen that in either position of the elliptical wheel several gripping-surfaces will be provided for use, thus allowing the rider to readily change his position at will, thereby preventing to a great extent the fatigue incident to remaining in the same posture for a considerable length of time.

What I claim, and desire to secure by Letters Patent, is—

1. In a bicycle, the combination with the steering-head, of a handle-post rotatably mounted therein and means for securing said post in a fixed position, and an elliptical-shaped steering-wheel fixed upon the handle-post, and providing a continuous gripping-surface for the hands of the rider, said wheel being adjustably mounted so as to present either the major or the minor diameter of the ellipse in a line with the rider.

2. A handle-bar for bicycles or like vehicles, consisting of an elliptical-shaped wheel, the rim of which provides a continuous gripping-surface for the hands of the rider, so arranged that a handle-bar of different widths will be provided.

3. A handle-bar for bicycles or like vehicles, consisting of an elliptical-shaped wheel-rim forming a continuous gripping-surface, and two pairs of spokes radiating from the center of the ellipse and connecting the said rim at the major and minor axis respectively so as to provide two sets of gripping-surfaces, the one set being wider than the other.

In testimony whereof I affix my signature in presence of two witnesses.

WILLIAM CLINTON BRANDENBURG.

Witnesses:
ASA HEPNER,
JOHN E. BARNES.